Feb. 10, 1942.    C. C. DE PEW    2,272,189
DYNAMIC DAMPER FOR ENGINES
Filed June 29, 1939    2 Sheets-Sheet 1

INVENTOR
Chester C. De Pew
BY
Hogart, ... Campbell
ATTORNEYS

Feb. 10, 1942. C. C. DE PEW 2,272,189
DYNAMIC DAMPER FOR ENGINES
Filed June 29, 1939 2 Sheets-Sheet 2
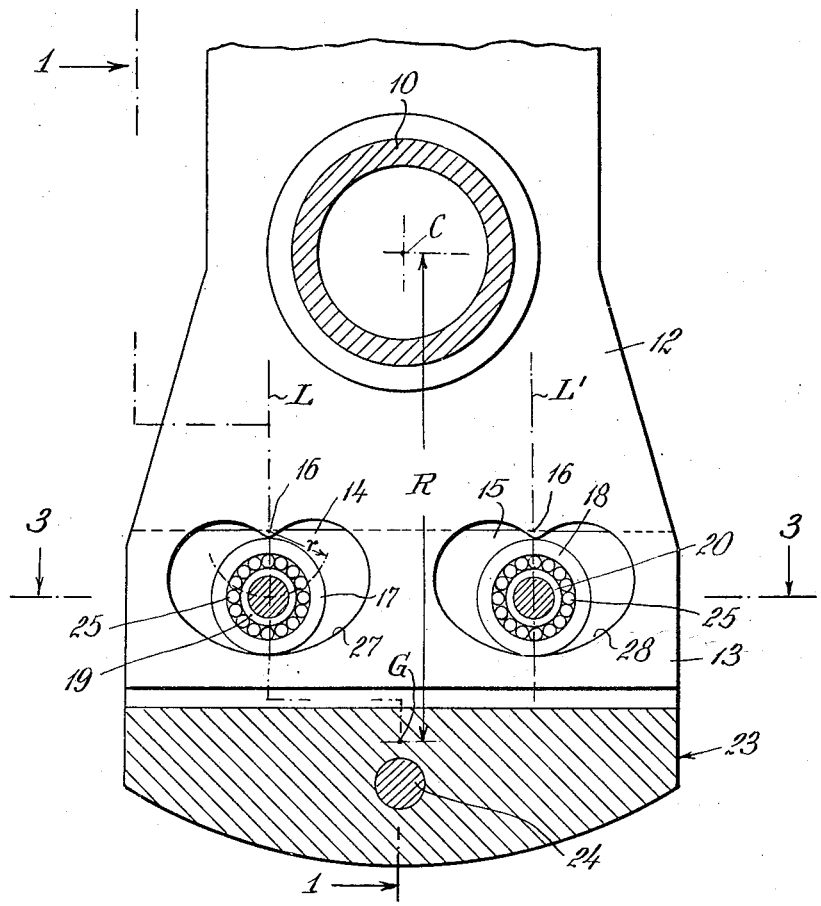
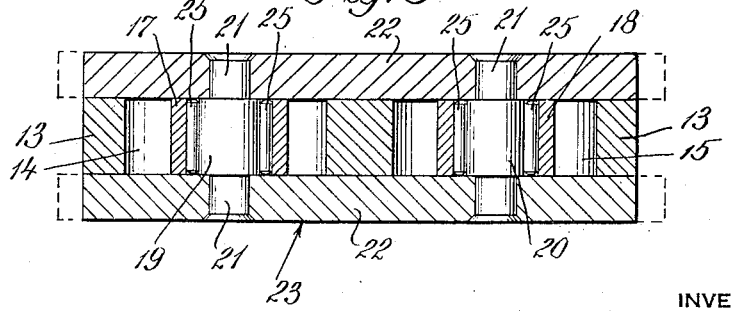

Patented Feb. 10, 1942

2,272,189

UNITED STATES PATENT OFFICE 2,272,189

DYNAMIC DAMPER FOR ENGINES

Chester C. De Pew, Farmingdale, N. Y., assignor to Ranger Engineering Corporation, Farmingdale, N. Y., a corporation of Delaware Application June 29, 1939, Serial No. 281,844

7 Claims. (Cl. 74—604)

This invention relates to dynamic dampers, and has particular reference to an improved form of synchronous pendulum damper for the torsional vibrations in the crankshaft of an internal combustion engine, although the invention is not limited to that use.

In order to be as effective as possible within the limits of physical construction, a dynamic damper must freely respond to the frequency of the vibration to be damped by setting up counter-impulses of the same frequency or order, but 180° out of phase thereto. The efficiency of such devices used heretofore has been impaired by reason of restrictions in the freedom of angular movement of the mobile mass, sensitivity to axial vibrations, friction, radial backlash, and the like.

In accordance with this invention, a dynamic damper for the torsional vibrations of an engine crankshaft and the like is provided, and which responds freely and accurately only to the vibrations to be damped, may be readily adapted to respond to different orders of vibrations without material change, operates with minimum friction, supplies fully corrective counter-impulses throughout its entire scope of movement, is simple and inexpensive to construct and has a high degree of efficiency under all operating conditions.

A preferred embodiment of the invention comprises a bifilar pendulum of short length having the characteristics of a simple pendulum in that any line on the counter-weight always moves parallel to itself, the counter-weight being suspended by two spaced wheels on fixed axes rolling on equally-curved races in an extension of the crankshaft cheek, whose radii of curvature are less than the radius of rotation of center of gravity of the counter-weight and are determined by the order of the vibration to be damped, and whose centers of curvature are spaced the same distance as the space between the axes of the wheels, so that the counter-weight moves parallel to itself without disturbing rotational component. The clearance between the inner surfaces of the races in the crankshaft cheek extension and the corresponding wheels is just enough to prevent contact, so that there is little or no backlash during starting and stopping and deceleration of the engine and no separate anti-backlash means are required. The counter-weight is so constructed that it closely embraces but does not drag on the axial walls of the crankshaft cheek extension, whereby the counter-weight is substantially immune to longitudinal vibrations of the crankshaft and the races may be of such length that the counter-weight is free to move to the limit necessary to respond to the vibration to be damped.

It will be seen that the mobile counter-weight so suspended from a rotating shaft will oscillate a predetermined number of cycles for each revolution of the crankshaft, regardless of the revolution speed of the crankshaft, and that when the number of cycles per revolution of the counter-weight is synchronized with any given order of crankshaft torsional vibration, by proper selection of the radii of the crankshaft cheek races, then, at any crankshaft speed, the counter-weight will swing 180° out of phase with crankshaft torsional vibration of the given order, thereby suppressing the same.

For a more complete understanding of the invention, reference may be had to the accompanying drawings, in which:

Fig. 2 is an end elevation of the same, as seen in partial section along the line 2—2 of Fig. 1; and Fig. 3 is a transverse section through the same as seen along the line 3—3 of Fig. 2.

Figure 1:
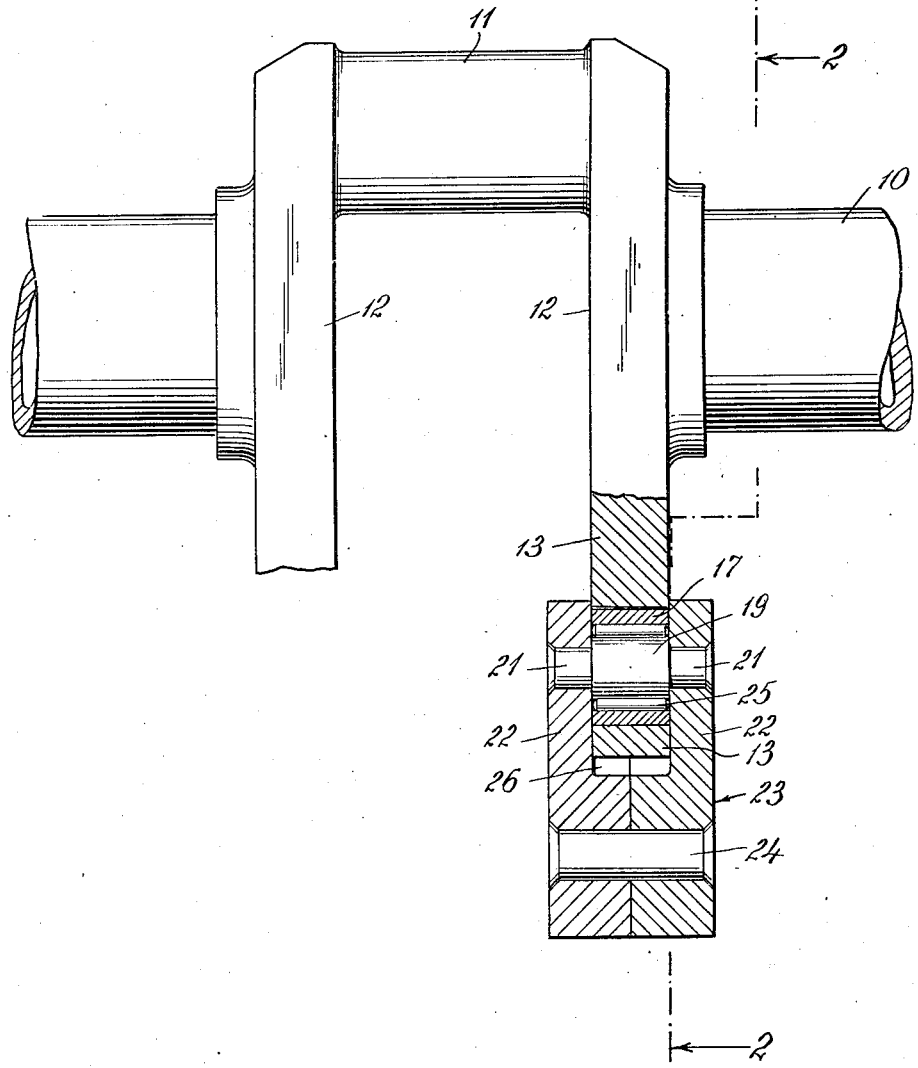
Figure 1 is an elevation of the crank of a crankshaft for a radial or in-line aeronautical engine, for example, showing the crankshaft cheek extension and the dynamic counter-weight damper of this invention in section as seen along the line 1—1 of Fig. 2.

Referring to Fig. 1 of the drawings, numeral 10 designates the crankshaft of an internal combustion engine or the like, having the crank pin 11, and the crankshaft cheeks 12. At least one of the crankshaft cheeks 12 is provided with a radial extension 13 opposite the crank pin 11, and preferably integral with the crankshaft cheek 12, although it may be separately formed as desired. As shown particularly in Fig. 2, extension 13 is provided with a pair of spaced, curved through slots 14 and 15, whose centers of curvature 16 are located on parallel lines L and L' spaced preferably equal distances from the center of rotation C of the crankshaft 10, i. e., equal distances from the center line of the crank cheek as seen in Fig. 2. The slots 14 and 15 are shown rounded at their ends and accordingly are preferably substantially kidney-shaped, although not necessarily that shape.

Positioned in slots 14 and 15 are respective wheels 17 and 18, whose respective fixed shafts or axes 19 and 20 are slightly longer than the thickness of the cheek 13 and roller 17 and whose opposite ends are reduced in diameter to form studs 21. These studs 21 pass through openings in like side plates 22 which form a counter-weight 23 and are riveted over so as to hold the upper ends of the counter-weight plates 22 in fixed spaced relation, whereas the lower ends of the counterweight plates 22 are enlarged so as to abut each other and are secured together by the rivet 24. The axes or shafts 19 and 20 of the wheels 17 and 18 are spaced apart the same distance as are the centers 16 of curvature of the corresponding races 27 and 28, so that when the counterweight 23 is at rest, the wheels 17 and 18 lie on the lines L and L', and the weight of the counterweight 23 is distributed equally at opposite sides of the center of rotation C. The shoulders formed by the reduced ends of studs 21 of shafts or axles 19 and 20 of the wheels 17 and 18 accordingly space the upper ends of side plates 22 of the counterweight 23 apart so as to closely embrace but not drag on the crankshaft cheek 13 during oscillation of counterweight 23.

Needle bearings 25 are interposed between the wheels 17 and 18 and their corresponding shafts or axles 19 and 20 to reduce the friction of rotation of the wheels 17 and 18 on their corresponding shafts or axles 19 and 20. The counterweight 23 accordingly depends from the extension 13, being supported by the two wheels 17 and 18 in the manner of a bifilar pendulum. A space 26 is left between the end of the crankshaft cheek extension 13 and the corresponding surface of the counterweight 23 as shown in Figs. 1 and 2, so that the counterweight 23 may move freely relatively to the crankshaft cheek extension 13 as the wheels 17 and 18 roll within the slots on the corresponding races 27 and 28, respectively, these races being the outermost walls of the corresponding slots 14 and 15. The general movement of the counter-weight 23 relatively to the crankshaft cheek extension 13 is indicated by the dotted lines in Fig. 3.

The center of curvature of each of the races 27 and 28 in the crankshaft cheek extension 13 on lines L and L' is at 16, and the radius $r$ of oscillation of the counter-weight 23 relatively to the crankshaft cheek extension 13 is selected in accordance with the order or frequency of the vibration to be damped, the arc of oscillation of the counter-weight 23 being the arc indicated in Fig. 2, that is, the arc of movement of each of the axes of the wheels 17 and 18. Inasmuch as the centers of curvature 16 of both races 27 and 28 on the lines L and L' are spaced equal distances from the center of rotation C of the crankshaft 10 and the curvatures of races 27 and 28 are identical, it follows that all points on the counter-weight 23, such as the center of gravity G thereof, describe the same arc of movement, namely, the arc described by the radius $r$. Likewise, any straight line on the counter-weight 23 always moves parallel to itself, without any rotational component.

The height of the slots 14 and 15 is slightly greater than the diameter of the corresponding wheels 17 and 18, so that there is no excess looseness or radial backlash of the counter-weight 23 during starting or when the engine is being stopped. Accordingly, no separate anti-backlash means are required. The length of the slots 14 and 15 is determined by the degree of freedom desired for the counter-weight 23 in its oscillation about the center of rotation C. The amount of freedom necessary is governed by the energy in the order of vibration to be damped and by the amount of inertia of the damping mass 23. The ends of the slots 14 and 15 are round, their radius being also slightly in excess of the radius of the wheels 17 and 18, and the ends of the slots form stops for the wheels in the rare instances of overswing of the counter-weight 23 during sudden starting and stopping shocks. However, in normal operation of the damper, the ends of the slots, having greater curvature than the corresponding races, form a steeper inclination at the ends of the races so that the wheels 17 and 18 are accelerated rapidly therefrom toward their mid-positions on the corresponding races, thus dissipating a large amount of energy and substantially precluding an impact of the wheels against the ends of the slots except under the aforementioned unusual conditions.

In operation, the centrifugal force of the damping mass 23 developed during rotation about the center C of the crankshaft 10 maintains the wheels 17 and 18 in intimate contact with their corresponding races 27 and 28, and since this centrifugal force at operating speeds is greatly in excess of gravity, the gravitational effect on counter-weight 23 is negligible. Since the restoring force tending to return the counter-weight 23 to its mid-position is dependent upon centrifugal force, which is a function of revolutions per minute of the crankshaft, the frequency of the oscillations of the counter-weight vary with revolutions per minute. Furthermore, since the frequency of the vibration to be damped varies with the speed of the crankshaft, the damper may be tuned so that it will have the same frequency as the vibration to be damped at all crankshaft speeds. The counter-weight will therefore oscillate in synchronism with a selected order of torsional vibration in the crankshaft 10, but substantially 180° out of phase thereto so as to suppress this order of vibration. If $n$ is the frequency required for the pendulum in oscillations for each revolution of the crankshaft 10, in order to suppress vibration of a given order, and if friction is disregarded as being negligible, then $$\frac{r}{R-r}n^2=1$$

in which $r$ is the length of the pendulum as indicated in Fig. 2 and R is the radius of rotation of the center of gravity G of the counter-weight 23 as shown in Fig. 2.

Accordingly the dynamic damper of this invention responds to torsional vibration of any given order in the crankshaft 10 by synchronous but out-of-phase oscillation in a curved path having a shorter radius $r$ of movement than the radius R of rotation of the center of gravity G of the counter-weight 23, so that counter-impulses are introduced into the crankshaft by the counter-weight 23 substantially 180° out of phase to the torsional vibration whereby the latter is effectively damped. Since the counter-weight 23 swings as a pendulum without rotational component and with negligible friction, no disturbing oscillations or vibrations are introduced by the counter-weight 23 during its movement.

Merely by changing the radius $r$ the dynamic damper of this invention may be adapted to the suppression of any order of torsional vibration. Thus, for a long crankshaft, such as in an in-line engine, two or more such dampers may be employed, one for each order of vibration to be damped, the radius of the races 27 and 28 being changed to provide the requisite pendulum length for the order of vibration to be damped. The invention permits large angular movements of the counter-weight damper mass at low as well as high orders of vibration, thereby reducing the total mass necessary to suppress a given amount of torsional vibration. It will be understood that the curvature of each race 27 or 28, while having its center on lines L or L', need not be a circular curvature but may be elliptical, for example, depending upon requirements.

Inasmuch as the upper ends of the side plates 22 of counter-weight 23 closely embrace the axial surfaces of the crankshaft cheek extension 13, so that there is a minimum of axial clearance, the counter-weight 23 is substantially immune to longitudinal vibration of the crankshaft 10, and accordingly is substantially only responsive to oscillations in the plane of rotation set up by torsional vibrations.

While a preferred embodiment of the invention has been illustrated and described herein, it is to be understood that the invention is not limited thereby but is susceptible of changes in form and detail within the scope of the appended claims. For example, instead of providing the race-forming slots 14 and 15 in the crankshaft cheek extension 13, they may be provided in the counter-weight side plates 22, with the wheels like 17 and 18 journalled on the opposite ends of stub shafts extending from opposite faces of the extension 13, so that counter-weight 23 is suspended as before except that the inner or shaft sides of the slots 14 and 15 constitute the races, as will be readily understood, being merely a reversal of the parts.

I claim:

1. A dynamic damper for torsional vibrations in a rotating shaft, comprising a radial shaft extension having similar spaced curved races, a counter-weight, and spaced wheels on said counter-weight rotatably engaging the corresponding races for supporting the counter-weight on said shaft extension, the spacing between the axes of rotation of said wheels being substantially equal to the spacing between the centers of curvature of said races.

2. A dynamic damper for torsional vibrations in a rotating shaft, comprising a radial shaft extension having similar spaced curved races, a counter-weight, and spaced wheels on said counter-weight rotatably engaging the corresponding races for supporting the counter-weight on said shaft extension and having a shorter radius than the radius of curvature of the corresponding races, the spacing between the axes of rotation of said wheels being substantially equal to the spacing between the centers of curvature of said races.

3. A dynamic damper for torsional vibrations in a rotating shaft, comprising a radial shaft extension having similar spaced curved races, a counter-weight, and wheels on said counter-weight rotatably engaging the corresponding races for supporting the counter-weight on said shaft extension, said wheels being positioned between the center of gravity of the counter-weight and the center of rotation of the shaft and being spaced apart substantially the same distance as the centers of curvature of said races.

4. A dynamic damper for torsional vibrations in a rotating shaft, comprising a member on the shaft rotating therewith, a counterweight member, and means connecting said members for relative movement in the plane of rotation, said means including wheels journalled at two spaced points on one of said members and engaging a pair of similar curved races on the other member whose centers of curvature are spaced apart a distance substantially equal to the space between the said journal points of said wheels, whereby the counterweight member is supported on said shaft member for movement as a pendulum.

5. A dynamic damper for torsional vibrations in a rotating shaft, comprising a member on the shaft rotating therewith, a counterweight member, and means connecting said members for relative movement in the plane of rotation, said means including wheels journalled at two spaced points on one of said members and engaging a pair of similar curved races on the other member whose centers of curvature are spaced apart a distance substantially equal to the space between the said journal points of said wheels, whereby the counterweight member is supported on said shaft member for movement as a pendulum, one of said members loosely embracing the other member in an axial direction to inhibit axial backlash between them.

6. A dynamic damper for torsional vibrations in a rotating shaft, comprising a radial shaft extension having two similar spaced arcuate slots, a counterweight comprising a pair of plates embracing said extension for movement only in the plane of its rotation, two shafts extending between said plates through the corresponding slots and spaced the same distance as the center of curvature of said slots, and a wheel on each of said shafts engaging the outermost walls of the corresponding slots, the curvature of said slots being less than the curvature of the arc of rotation of the center of gravity of said counterweight whereby the counterweight has a limited movement relatively to said extension as the wheels roll on said slot walls in response to torsional vibrations in said shaft.

7. A dynamic damper for torsional vibrations in a rotating shaft, comprising a radial shaft extension having two similar spaced arcuate slots, a counterweight comprising a pair of plates embracing said extension for movement only in the plane of its rotation, two shafts extending between said plates through the corresponding slots and spaced the same distance as the center of curvature of said slots, and a wheel on each of said shafts engaging the outermost walls of the corresponding slots, the curvature of said slots being less than the curvature of the arc of rotation of the center of gravity of said counterweight whereby the counterweight has a limited movement relatively to said extension as the wheels roll on said slot walls in response to torsional vibrations in said shaft, and rotating bearing members interposed between said wheels and their corresponding shafts.

CHESTER C. DE PEW.